United States Patent
Reichenbach-Klinke et al.

(10) Patent No.: US 8,752,624 B2
(45) Date of Patent: Jun. 17, 2014

(54) AQUEOUS FORMULATIONS OF HYDROPHOBICALLY ASSOCIATING COPOLYMERS AND SURFACTANTS AND USE THEREOF FOR MINERAL OIL PRODUCTION

(75) Inventors: Roland Reichenbach-Klinke, Traunstein (DE); Björn Langlotz, Trostberg (DE)

(73) Assignee: BASF SE, Ludwigshafen (DE)

( * ) Notice: Subject to any disclaimer, the term of this patent is extended or adjusted under 35 U.S.C. 154(b) by 226 days.

(21) Appl. No.: 13/303,773

(22) Filed: Nov. 23, 2011

(65) Prior Publication Data

US 2012/0125606 A1     May 24, 2012

Related U.S. Application Data

(60) Provisional application No. 61/416,748, filed on Nov. 24, 2010.

(51) Int. Cl.
*E21B 43/22*     (2006.01)

(52) U.S. Cl.
USPC ............ 166/270.1; 166/300; 166/305.1; 166/371

(58) Field of Classification Search
None
See application file for complete search history.

(56) References Cited

U.S. PATENT DOCUMENTS

| | | | |
|---|---|---|---|
| 4,814,096 A | 3/1989 | Evani | |
| 5,741,947 A | 4/1998 | Wolf et al. | |
| 6,392,596 B1 | 5/2002 | Lin et al. | |
| 2001/0020531 A1 | 9/2001 | Varadaraj | |
| 2004/0024154 A1 | 2/2004 | Schinabeck et al. | |
| 2008/0200590 A1 | 8/2008 | Schinabeck et al. | |
| 2010/0197529 A1 | 8/2010 | Favero et al. | |
| 2010/0331510 A1 | 12/2010 | Reichenbach-Klinke et al. | |
| 2011/0247830 A1 | 10/2011 | Bittner et al. | |

FOREIGN PATENT DOCUMENTS

| | | |
|---|---|---|
| CA | 832 277 A | 1/1970 |
| CA | 2760734 | 11/2010 |
| DE | 4325237 A1 | 2/1995 |
| DE | 100 37 629 A1 | 2/2002 |
| DE | 10243361 A1 | 4/2004 |
| DE | 10 2004 032 304 A1 | 2/2006 |
| EP | 705 854 A1 | 4/1996 |
| EP | 2287216 | 2/2011 |
| FR | 2920818 | 3/2009 |
| GB | 2 199 354 A | 7/1988 |
| WO | WO 85/03510 | 8/1985 |
| WO | WO-2009/124922 A1 | 10/2009 |
| WO | WO-2010/133527 A2 | 11/2010 |
| WO | WO-2011/015520 A1 | 2/2011 |
| WO | WO 2012/069438 | 3/2012 |

OTHER PUBLICATIONS

Taylor, K.C., "Hydrophobically Associating Polymers for Oil Field Applications", Canadian Int'l Petroleum conf. 2007, Alberta, CA, Jan. 1, 2007, XP55018722.
PCT/EP2011/070612, Nov. 22, 2011 International Search report, Dated Feb. 27, 2012.
U.S. Appl. No. 13/303,686, filed Nov. 23, 2011, BASF SE.
U.S. Appl. No. 13/303,649, filed Nov. 23, 2011, BASF SE
U.S. Appl. No. 13/378,684, Dec. 12, 2011, BASF SE
U.S. Appl. No. 13/292,264.
Petroleum, Enhanced Oil Recovery, Kirk-Othmer, Encyclopedia of Chemical Technology, online edition, John Wiley & Sons, 2010 (29 pp).
Petroleum, Kirk-Othmer, Encyclopedia of Chemical Technology, online edition, John Wiley & Sons, 2010 (42 pp).
Rashidi et al, Viscosity Study of Salt Tolerant Polymers, Journal of Applied Polymer Science DOI 10.1002/app -0 (2009), pp. 1551-1557.
W. Zhou et al., Effect of Sodium Dodecyl Benzene Sulfonate on Water-Soluble Hydrophobically Associatign Polymer Solutions, Journal of Canadian Petroleum Technology, Feb. 2004, vol. 43, No. 2—pp. 13-16.
U.S. Appl. No. 13/440,049, filed Apr. 5, 2012, Reichenbach-Klinke et al.
D. G. Kessel, *Journal of Petroleum Science and Engineering*, 2 (1989) 81-101.
R.S. Seright, "The effects of mechanical degradation and viscoelastic behavior on injectivity of polyacrylamide solutions", SPE Journal 23(3), 1983, pp. 475-485 ).
R.S. Seright, M. Seheult and T. Talashek "Injectivity characteristics of EOR polymers", SPE Reservoir Evaluation & Enginnering, 12 (5), 2009, pp. 783-792.
D. Morel, M. Vert, S. Jouenne, E. Nahas, "Polymer injection in deep offshore field: The Dalia Angola case", SPE Annual Technical Conference and Exhibition, Sep. 2008, Denver Colorado, USA, paper No. SPE 116672), pp. 1-12.
J.M. Maerker, Shear Degradation of partially hydrolyzes polyacrylamide solutions, SPE Journal 15(4), 1975, pp. 311-322.
Taylor, K.C. and Nasr-El-Din, H.A. in J. Petr. Sci. Eng. 1998, 19, 265-280.
Iglauer et al., New surfactant classes for enhanced oil recovery and their tertiary oil recovery potential, Journal of Petroleum Science and Engineering 71 (2010) 23-29.

*Primary Examiner* — Zakiya W Bates
(74) *Attorney, Agent, or Firm* — Drinker Biddle & Reath LLP

(57) ABSTRACT

A process for mineral oil production, in which an aqueous formulation comprising at least one water-soluble, hydrophobically associating copolymer (A) and at least one nonionic and/or anionic surfactant (B) is injected through at least one injection borehole into a mineral oil deposit, and crude oil is withdrawn from the deposit through at least one production borehole, wherein the water-soluble, hydrophobically associating copolymer comprises at least acrylamide or derivatives thereof, a monomer having anionic groups and a monomer which can bring about the association of the copolymer, and aqueous formulation, which is suitable for execution of the process.

16 Claims, No Drawings

AQUEOUS FORMULATIONS OF HYDROPHOBICALLY ASSOCIATING COPOLYMERS AND SURFACTANTS AND USE THEREOF FOR MINERAL OIL PRODUCTION

CROSS-REFERENCE TO RELATED APPLICATION

This application claims the benefit of U.S. Provisional Application Ser. No. 61/416,748 filed Nov. 24, 2010, the entire contents of which are incorporated herein by reference in its entirety.

FIELD OF THE INVENTION

The present invention relates to a process for mineral oil production, in which an aqueous formulation comprising at least one water-soluble, hydrophobically associating copolymer (A) and at least one nonionic and/or anionic surfactant (B) is injected through at least one injection borehole into a mineral oil deposit, and crude oil is withdrawn from the deposit through at least one production borehole, wherein the water-soluble, hydrophobically associating copolymer comprises at least acrylamide or derivatives thereof, a monomer having anionic groups and a monomer which can bring about the association of the copolymer. The invention further relates to an aqueous formulation which has particularly good suitability for execution of the process.

BACKGROUND

In natural mineral oil deposits, mineral oil is present in the cavities of porous reservoir rocks which are sealed toward the surface of the earth by impermeable top layers. The cavities may be very fine cavities, capillaries, pores or the like. Fine pore necks may, for example, have a diameter of only approx. 1 μm. As well as mineral oil, including fractions of natural gas, a deposit also comprises water with a greater or lesser salt content.

In mineral oil production, a distinction is drawn between primary, secondary and tertiary production.

In primary production, after commencement of drilling of the deposit, the mineral oil flows of its own accord through the borehole to the surface owing to the autogenous pressure of the deposit. The autogenous pressure can be caused, for example, by gases present in the deposit, such as methane, ethane or propane. The autogenous pressure of the deposit, however, generally declines relatively rapidly on extraction of mineral oil, such that usually only approx. 5 to 10% of the amount of mineral oil present in the deposit, according to the deposit type, can be produced by means of primary production. Thereafter, the autogenous pressure is no longer sufficient to produce mineral oil.

After primary production, secondary production is therefore typically used. In secondary production, in addition to the boreholes which serve for the production of the mineral oil, known as the production boreholes, further boreholes are drilled into the mineral oil-bearing formation. These are known as injection boreholes, through which water is injected into the deposit (known as "water flooding"), in order to maintain the pressure or to increase it again. As a result of the injection of the water, the mineral oil is gradually forced through the cavities in the formation, proceeding from the injection borehole, in the direction of the production borehole. However, this works only for as long as the cavities are completely filled with oil and the more viscous oil is pushed onward by the water. As soon as the mobile water breaks through cavities, it flows on the path of least resistance from this time onward, i.e. through the channel formed, and no longer pushes the oil onward. By means of primary and secondary production, therefore, generally only approx. 30 to 35% of the amount of mineral oil present in the deposit can be produced.

After the measures of secondary mineral oil production, measures of tertiary mineral oil production (also known as "Enhanced Oil Recovery (EOR)") are therefore also used to further enhance the oil yield. This includes processes in which particular chemicals, such as surfactants and/or polymers, are used as assistants for oil production. An overview of tertiary oil production using chemicals can be found, for example, in the article by D. G. Kessel, *Journal of Petroleum Science and Engineering*, 2 (1989) 81-101.

The techniques of tertiary mineral oil production include what is known as "polymer flooding". Polymer flooding involves injecting an aqueous solution of a thickening polymer through the injection boreholes into the mineral oil deposit, the viscosity of the aqueous polymer solution being matched to the viscosity of the mineral oil. As a result of the injection of the polymer solution, the mineral oil, as in the case of water flooding, is forced through the cavities mentioned in the formation, proceeding from the injection borehole, in the direction of the production borehole, and the mineral oil is produced through the production borehole. By virtue of the fact that the polymer formulation, however, has about the same viscosity as the mineral oil, the risk is reduced that the polymer formulation breaks through to the production borehole with no effect, and hence the mineral oil is mobilized much more homogeneously than in the case of use of mobile water. It is thus possible to mobilize additional mineral oil in the formation.

For polymer flooding, a multitude of different thickening polymers have been proposed, especially high molecular weight polyacrylamide, copolymers of acrylamide and further comonomers, for example vinylsulfonic acid or acrylic acid. Polyacrylamide may especially be partly hydrolyzed polyacrylamide, in which some of the acrylamide units have been hydrolyzed to acrylic acid. In addition, it is also possible to use naturally occurring polymers, for example xanthan or polyglycosylglucan, as described, for example, by U.S. Pat. No. 6,392,596 B1 or CA 832 277.

Another of the techniques of tertiary mineral oil production is known as "surfactant flooding". Surfactant flooding involves injecting suitable surfactants into the mineral oil deposit through the injection borehole. The surfactants lower the interfacial tension σ between the mineral oil and the aqueous phase. Mineral oil remaining in the mineral oil formulation forms a micro-emulsion with the surfactants, such that it can now also be forced out of the formation through fine capillary openings by injected flooding water.

Details of techniques for tertiary mineral oil production such as "surfactant flooding" and "polymer flooding" for example are disclosed, for example, in "*Petroleum, Enhanced Oil Recovery*, Kirk-Othmer, *Encyclopedia of Chemical Technology*, online edition, John Wiley & Sons, 2010".

As already outlined above, the case may occur in water flooding that the mineral oil deposit is exploited inhomogeneously. In more pervious regions of the mineral oil formation, the reservoir is exploited to a greater degree, and there may be a breakthrough of the water to the production borehole.

When the technique of surfactant flooding is applied to such mineral oil deposits, there is the risk that the surfactant solution also flows through more pervious regions which therefore have lower flow resistances from the injection borehole to the production borehole, and mineral oil is not mobilized by the surfactant to the desired degree. It is therefore known that surfactant solutions can be thickened with thickening polymers in order to prevent the surfactant solution from flowing preferentially through the more pervious regions of the mineral oil deposit.

In addition to the abovementioned thickening polymers, hydrophobically associating copolymers can also be used for polymer flooding. "Hydrophobically associating copolymers" are understood by the person skilled in the art to mean water-soluble polymers which have lateral or terminal hydrophobic groups, for example relatively long alkyl chains. In aqueous solution, such hydrophobic groups can associate with themselves or with other substances having hydrophobic groups. This forms an associative network by which the medium is thickened. Details of the use of hydrophobically associating copolymers for tertiary mineral oil production are described, for example, in the review article by Taylor, K. C. and Nasr-El-Din, H. A. in *J. Petr. Sci. Eng.* 1998, 19, 265-280.

EP 705 854 A1, DE 100 37 629 A1 and DE 10 2004 032 304 A1 disclose water-soluble, hydrophobically associating copolymers and the use thereof, for example in the construction chemistry sector. The copolymers described comprise acidic monomers, for example acrylic acid, vinylsulfonic acid, acrylamidomethylpropanesulfonic acid, basic monomers such as acrylamide, dimethylacrylamide, or monomers comprising cationic groups, for example monomers having ammonium groups, and also monomers which can bring about the hydrophobic association of the individual polymer chains.

In the case of combination of hydrophobically associating polymers with surfactants, the viscosity of the solution obtained from polymer and surfactant, according to the type of interactions between the surfactants and the polymers, may be either greater or smaller than the viscosity of the polymer solution alone (see, for example, W. Zhou, Y Guo, M. Dong, H. Xiao, *Journal of Canadian Petroleum Technology*, 43(2), 2004, pages 13 to 16). For use for tertiary mineral oil production, a decrease in the viscosity is of course highly undesirable because more polymer has to be used to attain the desired viscosity, and this greatly impairs the economic viability of the process.

U.S. Pat. No. 4,814,096 discloses a mixture of hydrophobically associating polymers and surfactants for tertiary mineral oil extraction. The hydrophobically associating polymer comprises hydrophilic monomers, for example acrylamide. The hydrophobic monomers are $C_8$- to $C_{20}$-alkyl esters of ethylenically unsaturated carboxylic acids, N-alkyl derivatives of ethylenically unsaturated carboxamides with $C_8$- to $C_{20}$-alky radicals, vinyl alkylates of alkyl radicals having at least 8 carbon atoms and alkylstyrenes having alkyl radicals of at least 4 carbon atoms. The surfactants are nonionic surfactants and the ratio of polymer to surfactant is preferably 20:1 to 0.5:1.

GB 2 199 354 A1 discloses a mixture of hydrophobically associating polymers and surfactants for secondary mineral oil production. The polymer comprises acrylamide, monomers having sulfo groups and N-alkyl- or N,N'-dialkylacrylamides, where at least one of the alkyl radicals is a $C_6$- to $C_{22}$-alkyl radical. The polymer is used in an amount of 0.0001 to 0.5% by weight and the surfactant in an amount of 0.1% by weight to 5% by weight.

US 2010/0197529 A1 discloses a further mixture of hydrophobically associating polymers and surfactants for secondary mineral oil production. The polymer is notable in that it comprises a hydrophobic cationic monomer, preferably ethylenically unsaturated trialkylammonium derivatives, where at least one of the alkyl radicals is a $C_8$- to $C_{30}$-alky radical. The weight ratio of polymer to surfactant is 1:1 to 1:10.

Our prior application WO2010/133527 A2 discloses hydrophobically associating copolymers which comprise at least hydrophilic, monoethylenically unsaturated monomers, for example acrylamide, and monoethylenically unsaturated, hydrophobically associating monomers. The hydrophobically associating monomers have a block structure and have—in this sequence—an ethylenically unsaturated group, optionally a linking group, a first polyoxyalkylene block which comprises at least 50 mol % of ethyleneoxy groups, and a second polyoxyalkylene group which consists of alkyleneoxy groups having at least 4 carbon atoms. The application discloses the use of such copolymers as thickeners, for example for polymer flooding, for construction chemical applications or for detergent formulations.

Our prior application WO2011/015520 A1 discloses a process for preparing hydrophobically associating copolymers by polymerizing water-soluble, monoethylenically unsaturated surface-active monomers and monoethylenically unsaturated hydrophilic monomers in the presence of surfactants, and the use of such copolymers for polymer flooding.

Both applications further disclose that the hydrophobically associating copolymers disclosed can be mixed with surfactants, without disclosing details with respect to the surfactants and the mixtures.

BRIEF SUMMARY

It was an object of the invention to provide novel mixtures of hydrophobically associating copolymers and suitable surfactants for tertiary mineral oil production.

Accordingly, a process for mineral oil production has been found, in which an aqueous formulation comprising at least one water-soluble, hydrophobically associating copolymer (A) and at least one surfactant (B) is injected through at least one injection borehole into a mineral oil deposit, and crude oil is withdrawn from the deposit through at least one production borehole, and wherein (A) the water-soluble, hydrophobically associating copolymer comprises (Aa) 0.1 to 15% by weight of at least one monoethylenically unsaturated, hydrophobically associating monomer (Aa), selected from the group of

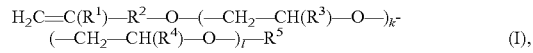

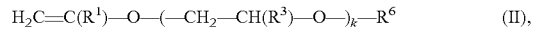

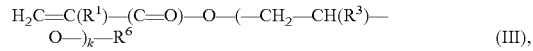

where the $-(-CH_2-CH(R^3)-O-)_k$ and $-(-CH_2-CH(R^4)-O-)_l$ units are arranged in block structure in the sequence shown in formula (I) and the radicals and indices are each defined as follows:

k: a number from 10 to 150, l: a number from 5 to 25, $R^1$: H or methyl, $R^2$: a single bond or a divalent linking group selected from the group of $-(C_nH_{2n})-$ [$R^{2a}$], $-O-(C_nH_{2n'})-$ [$R^{2b}$] and $-C(O)-O-(C_{n''}H_{2n''})-$ [$R^{2c}$], where n, n' and n" are each natural numbers from 1 to 6, R³: each independently H, methyl or ethyl, with the proviso that at least 50 mol % of the R² radicals are H, R⁴: each independently a hydrocarbyl radical having at least 2 carbon atoms or an ether group of the general formula —CH$_2$—O—R⁴', where R⁴' is a hydrocarbyl radical having at least 2 carbon atoms, R⁵: H or a hydrocarbyl radical having 1 to 30 carbon atoms, R⁶: an aliphatic and/or aromatic, straight-chain or branched hydrocarbyl radical having 8 to 40 carbon atoms, and furthermore (Ab) 85 to 99.9% by weight of at least one monoethylenically unsaturated, hydrophilic monomers (Ab) different than (Aa), where the monomers (Ab) comprise (Ab1) at least one uncharged, monoethylenically unsaturated, hydrophilic monomer (b1), selected from the group of (meth)acrylamide, N-methyl (meth)acrylamide, N,N'-dimethyl(meth)acrylamide or N-methylol(meth)acrylamide, and (Ab2) at least one anionic, monoethylenically unsaturated, hydrophilic monomer (Ab2) which at least one acidic group selected from the group of —COOH, —SO$_3$H and —PO$_3$H$_2$ and salts thereof, where the proportions are each based on the total amount of all monomers in the copolymer and the copolymer has a weight-average molecular weight $M_W$ of $1*10^6$ g/mol to $30*10^6$ g/mol, and (B) the at least one surfactant is a nonionic and/or anionic surfactant which is selected from the group of (Ba) nonionic surfactants of the general formula R¹⁵—O—(R¹⁶O)$_a$—H (VII) where the radicals are each defined as follows:

R¹⁵: a C$_{10}$- to C$_{36}$-hydrocarbyl radical,

R¹⁶O: independently an alkyleneoxy group having 2 to 4 carbon atoms, with the proviso that at least 50 mol % of the R¹⁶ radicals are 1,2-ethyleneoxy groups, a: a number from 3 to 100, (Bb) anionic surfactants of the general formula
R¹⁵—O—(R¹⁷O)$_b$—R¹⁸—Y (VIII) where the radicals are each defined as follows:

R¹⁵: as already defined,

R¹⁷O: independently alkyleneoxy groups having 2 to 4 carbon atoms, with the proviso that at least 30 mol % of the R¹⁷ radicals are 1,2-ethyleneoxy groups and/or 1,2-propyleneoxy groups, R¹⁸: a single bond or a divalent hydrocarbyl group having 1 to 10 carbon atoms, b: a number from 1 to 100, and Y: an acidic group or a salt thereof, selected from the group of sulfonate groups, sulfate groups, phosphonate groups, phosphoric acid groups or carboxyl groups, (Bc) star-shaped nonionic surfactants of the general formula
R¹⁹[(O—(CH—CH(R²⁰)—O)$_c$—(CH$_2$CH$_2$O)$_d$—(CH—CH(R²⁰)—O)$_e$—H]$_f$(IX) where the radicals are each defined as follows:

f: a number from 3 to 9,

R¹⁹: an f-valent hydrocarbyl radical,

R²⁰: an aliphatic hydrocarbyl radical having 1 to 3 carbon atoms, c: a number from 0 to 2, d: a number from 2 to 50, e: a number from 2 to 50, and where the amount of the copolymers (A) in the formulation is 0.02 to 2% by weight, the amount of the surfactants (B) is 0.005 to 1.0% by weight, and the viscosity of the formulation is at least 5 mPas (measured at 25° C.).

In a further aspect of the invention, aqueous formulations for mineral oil production have been found which comprise the hydrophobically associating copolymers (A) and the surfactants (B) of the type mentioned in the amounts mentioned.

DETAILED DESCRIPTION OF THE PREFERRED EMBODIMENTS

With regard to the invention, the following should be stated specifically:

For the process according to the invention, an aqueous formulation of at least one hydrophobically associating copolymer (A) and at least one surfactant (B) is used and is injected through an injection borehole into a mineral oil deposit. Of course, a plurality of different copolymers (A) and a plurality of surfactants (B) can also be used.

Hydrophobically Associating Copolymers (A) Used

The term "hydrophobically associating copolymer" is known in principle to those skilled in the art.

This comprises a water-soluble copolymer which, as well as hydrophilic molecular components which ensure sufficient water solubility, has lateral or terminal hydrophobic groups. In aqueous solution, the hydrophobic groups of the polymer can associate with themselves or with other substances having hydrophobic groups due to intermolecular forces. This gives rise to a polymeric network joined by intermolecular forces, which thickens the aqueous medium.

In the ideal case, the copolymers (A) used in accordance with the invention should be miscible with water in any ratio. According to the invention, however, it is sufficient when the copolymers are water-soluble at least at the desired use concentration and at the desired pH. In general, the solubility of the copolymer in water at room temperature under the use conditions should be at least 25 g/l.

According to the invention, the water-soluble, hydrophobically associating copolymer (A) comprises 0.1 to 15% by weight of at least one monoethylenically unsaturated, hydrophobically associating monomer (Aa) and 85 to 99.9% by weight of at least two monoethylenically unsaturated, hydrophilic monomers (Ab) different than (Aa). In addition, it is optionally possible for further, ethylenically unsaturated, preferably monoethylenically unsaturated, monomers (Ac) different than the monomers (Aa) and (Ab) to be present in an amount of up to 14.9% by weight. The amounts mentioned are based in each case on the sum of all monomers in the copolymer. Preference is given to using exclusively monoethylenically unsaturated monomers.

Monomers (Aa)

The water-soluble, hydrophobically associating copolymer (A) used comprises at least one monoethylenically unsaturated monomer (Aa) which imparts hydrophobically associating properties to the copolymer and shall therefore be referred to hereinafter as "hydrophobically associating monomer". According to the invention, the monomers (Aa) are selected from the group of

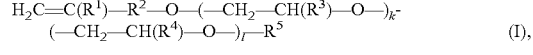

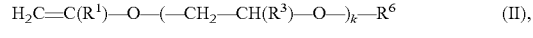

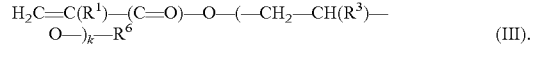

Monomers (Aa) of the Formula (I)

In the monomers (Aa) of the formula (I), an ethylenic group $H_2C=C(R^1)$— is bonded via a divalent linking group —$R^2$—O— to a polyoxyalkylene radical with block structure -(—$CH_2$—$CH(R^3)$—O—)$_k$-(—$CH_2$—$CH(R^4)$—O—)$_l$— $R^5$, where the two blocks -(—$CH_2$—$CH(R^3)$—O—)$_k$ and -(—$CH_2$—$CH(R^4)$—O—)$_l$ are arranged in the sequence shown in formula (I). The polyoxyalkylene radical has either a terminal OH group (for $R^5$=H) or a terminal ether group —$OR^5$ (when $R^5$ is a hydrocarbon radical).

In the abovementioned formula, $R^1$ is H or a methyl group.

$R^2$ is a single bond or a divalent linking group selected from the group of —$(C_nH_{2n})$— [$R^{2a}$ group], —O—$(C_nH_{2n'})$— [$R^{2b}$ group]- and —C(O)—O—$(C_{n''}H_{2n''})$— [$R^{2c}$ group]. In the formulae mentioned, n, n' and n'' are each a natural number from 1 to 6. In other words, the linking group comprises straight-chain or branched aliphatic hydrocarbyl groups having 1 to 6 hydrocarbon atoms, which are joined to the ethylenic group $H_2C=C(R^1)$— directly, via an ether group —O— or via an ester group —C(O)—O—. The —$(C_nH_{2n})$—, —$(C_nH_{2n'})$— and —$(C_{n''}H_{2n''})$— groups are preferably linear aliphatic hydrocarbyl groups.

The $R^{2a}$ group is preferably a group selected from —$CH_2$—, —$CH_2$—$CH_2$— and —$CH_2$—$CH_2$—$CH_2$—, more preferably a methylene group —$CH_2$—.

The $R^{2b}$ group is preferably a group selected from —O—$CH_2$—$CH_2$—, —O—$CH_2$—$CH_2$—$CH_2$— and —O—$CH_2$—$CH_2$—$CH_2$—$CH_2$—, more preferably —O—$CH_2$—$CH_2$—$CH_2$—$CH_2$—.

The $R^{2c}$ group is preferably a group selected from —C(O)—O—$CH_2$—$CH_2$—, —C(O)O—$CH(CH_3)$—$CH_2$—, —C(O)O—$CH_2$—$CH(CH_3)$—, —C(O)O—$CH_2$—$CH_2$—$CH_2$—$CH_2$— and —C(O)O—$CH_2$—$CH_2$—$CH_2$—$CH_2$—$CH_2$—$CH_2$—, more preferably —C(O)—O—$CH_2$—$CH_2$— and —C(O)O—$CH_2$—$CH_2$—$CH_2$—$CH_2$—, and most preferably —C(O)—O—$CH_2$—$CH_2$—.

The $R^2$ group is more preferably an $R^{2a}$ or $R^{2b}$ group, more preferably an $R^{2b}$ group i.e. monomers based on vinyl ethers.

In addition, $R^2$ is more preferably a group selected from —$CH_2$— and —O—$CH_2$—$CH_2$—$CH_2$—$CH_2$—, most preferably —O—$CH_2$—$CH_2$—$CH_2$—$CH_2$—.

The monomers (I) also have a polyoxyalkylene radical which consists of the units -(—$CH_2$—$CH(R^3)$—O—)$_k$ and -(—$CH_2$—$CH(R^4)$—O—)$_l$ where the units are arranged in block structure in the sequence shown in formula (I). The transition between the two blocks may be abrupt or else continuous.

In the -(—$CH_2$—$CH(R^3)$—O—)$_k$ block, the $R^3$ radicals are each independently H, methyl or ethyl, preferably H or methyl, with the proviso that at least 50 mol % of the $R^3$ radicals are H. Preferably at least 75 mol % of the $R^3$ radicals are H, more preferably at least 90 mol %, and they are most preferably exclusively H. The block mentioned is thus a polyoxyethylene block which may optionally also have certain proportions of propylene oxide and/or butylene oxide units, preferably a pure polyoxyethylene block.

The number of alkylene oxide units k is a number from 10 to 150, preferably 12 to 100, more preferably 15 to 80, even more preferably 20 to 30 and, for example, approx. 22 to 25. It is clear to the person skilled in the art in the field of polyalkylene oxides that the numbers mentioned are averages of distributions.

In the second, terminal -(—$CH_2$—$CH(R^4)$—O—)$_l$— block, the $R^4$ radicals are each independently hydrocarbyl radicals of at least 2 carbon atoms, preferably at least 3, more preferably 3 to 10 and most preferably 3 to 8 carbon atoms and, for example, 3 or 4 carbon atoms. This may be an aliphatic and/or aromatic, linear or branched carbon radical. It is preferably an aliphatic radical.

Examples of suitable $R^4$ radicals comprise ethyl, n-propyl, n-butyl, n-pentyl, n-hexyl, n-heptyl, n-octyl, n-nonyl or n-decyl, and phenyl. Examples of preferred radicals comprise n-propyl, n-butyl, n-pentyl, particular preference being given to an n-propyl radical.

The $R^4$ radicals may also be ether groups of the general formula —$CH_2$—O—$R^{4'}$ where $R^{4'}$ is an aliphatic and/or aromatic, linear or branched hydrocarbyl radical having at least 2 carbon atoms, preferably at least 3 and more preferably 3 to 10 carbon atoms. Examples of $R^{3'}$ radicals comprise n-propyl, n-butyl, n-pentyl, n-hexyl, 2-ethylhexyl, n-heptyl, n-octyl, n-nonyl n-decyl or phenyl.

The -(—$CH_2$—$CH(R^4)$—O—)$_l$— block is thus a block which consists of alkylene oxide units having at least 4 carbon atoms, preferably at least 5 carbon atoms, especially 5 to 10 carbon atoms, and/or glycidyl ethers having an ether group of at least 2, preferably at least 3, carbon atoms. Preferred $R^3$ radicals are the hydrocarbyl radicals mentioned; the units of the second terminal block are more preferably alkylene oxide units comprising at least 5 carbon atoms, such as pentene oxide units or units of higher alkylene oxides.

The number of alkylene oxide units l is a number from 5 to 25, preferably 6 to 20, more preferably 8 to 18, even more preferably 10 to 15 and, for example, approx. 12.

The $R^5$ radical is H or a preferably aliphatic hydrocarbyl radical having 1 to 30 carbon atoms, preferably 1 to 10 and more preferably 1 to 5 carbon atoms. $R^5$ is preferably H, methyl or ethyl, more preferably H or methyl and most preferably H.

In the monomers of the formula (I), a terminal monoethylenic group is joined to a polyoxyalkylene group with block structure, specifically firstly to a hydrophilic block having polyethylene oxide units, which is in turn joined to a second terminal hydrophobic block formed at least from butene oxide units, preferably at least pentene oxide units, or units of higher alkylene oxides, for example dodecene oxide. The second block has a terminal —$OR^5$— group, especially an OH-group. The terminal -(—$CH_2$—$CH(R^4)$—O—)$_l$ block with the $R^4$ radicals is responsible for the hydrophobic association of the copolymers prepared using the monomers (Aa). Etherification of the OH end group is an option which may be selected by the person skilled in the art according to the desired properties of the copolymer. A terminal hydrocarbyl group is, however, not required for the hydrophobic association, and the hydrophobic association also works with a terminal OH group.

It is clear to the person skilled in the art in the field of polyalkylene oxide block copolymers that the transition between the two blocks, according to the method of preparation, may be abrupt or else continuous. In the case of a continuous transition, there is a transition zone between the two blocks, which comprises monomers of both blocks. When the block boundary is fixed at the middle of the transition zone, the first block -(—$CH_2$—$CH(R^3)$—O—)$_k$ may accordingly also have small amounts of —$CH_2$—$CH(R^4)$—O— units and the second block -(—$CH_2$—$CH(R^4)$—O—)$_l$— small amounts of —$CH_2$—$CH(R^3)$—O— units, though these units are not distributed randomly over the block but arranged in the transition zone mentioned.

Preparation of the Monomers (Aa) of the Formula (I)

The hydrophobically associating monomers (Aa) of the formula (I) can be prepared by methods known in principle to those skilled in the art.

To prepare the monomers (Aa), a preferred preparation process proceeds from suitable monoethylenically unsaturated alcohols (IV) which are subsequently alkoxylated in a two-stage process such that the block structure mentioned is obtained. This gives monomers (Aa) of the formula (I) where $R^5$=H. These can optionally be etherified in a further process step.

The type of ethylenically unsaturated alcohols (IV) to be used is guided here especially by the $R^2$ group.

When $R^2$ is a single bond, the starting materials are alcohols (IV) of the general formula $H_2C$=$C(R^1)$—O—(—$CH_2$—$CH(R^7)$—O—$)_d$—H (IVa) where $R^1$ is as defined above, $R^7$ is H and/or $CH_3$, preferably H, and d is from 1 to 5, preferably 1 or 2. Examples of such alcohols comprise diethylene glycol vinyl ether $H_2C$=CH—O—$CH_2$—$CH_2$—O—$CH_2$—$CH_2$—OH or dipropylene glycol vinyl ether $H_2C$=CH—O—$CH_2$—$CH(CH_3)$—O—$CH_2$—$CH(CH_3)$—OH, preferably diethylene glycol vinyl ether.

To prepare monomers (Aa) in which $R^2$ is not a single bond, it is possible to use alcohols of the general formula $H_2C$=C$(R^1)$—$R^2$—OH (IVb) or alcohols which already have alkoxy groups and are of the formula $H_2C$=$C(R^1)$—$R^2$—O—(—$CH_2$—$CH(R^7)$—O—$)_d$—H (IVc), where $R^7$ and d are each as defined above, and $R^2$ in each case is selected from the group of $R^{2a}$, $R^{2b}$ and $R^{2c}$.

The preparation of the monomers with a linking $R^{2a}$ group preferably proceeds from alcohols of the formula $H_2C$=C$(R^1)$—$(C_nH_{2n})$—OH, especially $H_2C$=CH—$(C_nH_{2n})$—OH, or alcohols of the formula $H_2C$=$C(R^1)$—O—(—$CH_2$—$CH(R^7)$—O—$)_d$—H. Examples of preferred alcohols comprise allyl alcohol $H_2C$=CH—$CH_2$—OH or isoprenol $H_2C$=$C(CH_3)$—$CH_2$—$CH_2$—OH.

The preparation of the monomers with a linking $R^{2b}$ group proceeds from vinyl ethers of the formula $H_2C$=$C(R^1)$—O—$(C_{n'}H_{2n'})$—OH, preferably $H_2C$=CH—O—$(C_{n'}H_{2n'})$—OH. It is more preferably possible to use ω-hydroxybutyl vinyl ether $H_2C$=CH—O—$CH_2$—$CH_2$—$CH_2$—$CH_2$—OH.

The preparation of the monomers with a linking $R^{2c}$ group proceeds from hydroxyalkyl (meth)acrylates of the general formula $H_2C$=$C(R^1)$—C(O)—O—$(C_{n''}H_{2n''})$—OH, preferably $H_2C$=$C(R^1)$—C(O)—O—$(C_{n''}H_{2n''})$—OH. Examples of preferred hydroxyalkyl (meth)acrylates comprise hydroxyethyl (meth)acrylate $H_2C$=$C(R^1)$—C(O)—O—$CH_2$—$CH_2$—OH and hydroxybutyl (meth)acrylate $H_2C$=C$(R^1)$—C(O)—O—$CH_2$—$CH_2$—$CH_2$—$CH_2$—OH.

The starting compounds mentioned are alkoxylated, specifically in a two-stage process, first with ethylene oxide, optionally in a mixture with propylene oxide and/or butylene oxide, and in a second step with alkylene oxides of the general formula (Xa) or (Xb)

where $R^4$ in (Xa) and $R^{4'}$ in (Xb) are each as defined at the outset.

The performance of an alkoxylation including the preparation of the block copolymers from different alkylene oxides is known in principle to those skilled in the art. It is likewise known to those skilled in the art that the reaction conditions, especially the selection of the catalyst, can influence the molecular weight distribution of the alkoxylates and the orientation of the alkylene oxide units in a polyether chain.

The alkoxylates can be prepared, for example, by base-catalyzed alkoxylation. For this purpose, the alcohol used as the starting material can be admixed in a pressure reactor with alkali metal hydroxides, preferably potassium hydroxide, or with alkali metal alkoxides, for example sodium methoxide. By means of reduced pressure (e.g. <100 mbar) and/or increasing the temperature (30 to 150° C.), water still present in the mixture can be removed. Thereafter, the alcohol is present as the corresponding alkoxide. This is followed by inertization with inert gas (e.g. nitrogen) and, in a first step, stepwise addition of ethylene oxide, optionally in a mixture with propylene oxide and/or butylene oxide, at temperatures of 60 to 180° C., preferably 130 to 150° C. The addition is typically effected within 2 to 5 h, though the invention should not be restricted thereto. After the addition has ended, the reaction mixture is appropriately allowed to continue to react, for example for ½ h to 1 h. In a second step, alkylene oxides of the general formula (Xb) are subsequently metered in stepwise. The reaction temperature in the second stage can be maintained or else altered. A reaction temperature lower by approx. 10 to 25° C. than in the first stage has been found to be useful.

The alkoxylation can also be undertaken by means of techniques which lead to narrower molecular weight distributions than the base-catalyzed synthesis. For this purpose, the catalysts used may, for example, be double hydroxide clays as described in DE 43 25 237 A1. The alkoxylation can more preferably be effected using double metal cyanide catalysts (DMC catalysts). Suitable DMC catalysts are disclosed, for example, in DE 102 43 361 A1, especially paragraphs [0029] to [0041] and the literature cited therein. For example, it is possible to use catalysts of the Zn—Co type. To perform the reaction, the alcohol used as the starting material can be admixed with the catalyst, and the mixture can be dewatered as described above and reacted with the alkylene oxides as described. Typically, not more than 250 ppm of catalyst based on the mixture are used, and the catalyst can remain in the product due to this small amount.

The alkoxylation can additionally also be undertaken under acid catalysis. The acids may be Brønsted or Lewis acids. To perform the reaction, the alcohol used as the starting material can be admixed with the catalyst, and the mixture can be dewatered as described above and reacted with the alkylene oxides as described. At the end of the reaction, the acidic catalyst can be neutralized by addition of a base, for example KOH or NaOH, and filtered off if required.

It is clear to the person skilled in the art in the field of the polyalkylene oxides that the orientation of the hydrocarbyl radicals $R^4$ and optionally $R^3$ may depend on the conditions of the alkoxylation, for example on the catalyst selected for the alkoxylation. The alkylene oxide groups can thus be incorporated into the monomer either in the -(—$CH_2$—$CH(R^4)$—O—) orientation or else in the inverse -(—$CH(R^4)$—$CH_2$—O—)— orientation. The description in formula (I) should therefore not be considered to be restricted to a particular orientation of the $R^3$ or $R^4$ groups.

When the terminal OH group of the monomers (Aa) of the formula (I) (i.e. $R^5$=H) is to be etherified, this can be accomplished with customary alkylating agents known in principle to those skilled in the art, for example alkyl sulfates. For etherification, it is especially possible to use dimethyl sulfate or diethyl sulfates.

The preferred preparation process described for the monomers (I) has the advantage that the formation of possibly crosslinking by-products having two ethylenically unsaturated groups is substantially avoided. Accordingly, it is possible to obtain copolymers with a particularly low gel content.

Monomers (Aa) of the Formulae (II) and (III)

In the monomers of the formulae (II) and (III), $R^1$, $R^3$ and k are each defined as already outlined.

$R^6$ is an aliphatic and/or aromatic, straight-chain or branched hydrocarbyl radical having 8 to 40 carbon atoms, preferably 12 to 32 carbon atoms. For example, it may comprise n-alkyl groups such as n-octyl, n-decyl or n-dodecyl groups, phenyl groups, and especially substituted phenyl groups. Substituents on the phenyl groups may be alkyl groups, for example $C_1$-$C_6$-alkyl groups, preferably styryl groups. Particular preference is given to a tristyrylphenyl group.

The hydrophobically associating monomers of the formulae (II) and (III) and the preparation thereof are known in principle to those skilled in the art, for example from EP 705 854 A1.

Amounts of Monomers (Aa)

The amount of the monoethylenically unsaturated, hydrophobically associating monomers (Aa) is 0.1 to 15% by weight, based on the total amount of all monomers in the copolymer, especially 0.1 to 10% by weight, preferably 0.2 to 5% by weight and more preferably 0.5 to 2% by weight.

Particular preference is given to using monomers (Aa) of the general formula (I) to prepare the inventive copolymers, very particular preference to using monomers (a) of the general formula (I) which $R^2$ is an $R^{2b}$ radical.

Monomers (Ab)

Over and above the monomers (Aa), the hydrophobically associating copolymer used in accordance with the invention comprises at least two monoethylenically unsaturated, hydrophilic monomers (Ab) different than (Aa).

More preferably, the hydrophilic monomers (Ab) used are miscible with water in any ratio, but it is sufficient for execution of the invention that the inventive, hydrophobically associating copolymer possesses the water solubility mentioned at the outset. In general, the solubility of the monomers (Ab) in water at room temperature should be at least 50 g/l, preferably at least 150 g/l and more preferably at least 250 g/l.

According to the invention, the copolymer comprises at least one uncharged, monoethylenically unsaturated, hydrophilic monomer (Ab1) selected from the group of (meth)acrylamide, N-methyl(meth)acrylamide, N,N'-dimethyl(meth)acrylamide or N-methylol(meth)acrylamide. Preference is given to (meth)acrylamide, especially acrylamide. When mixtures of different monomers (Ab1) are used, at least 50 mol % of the monomers (Ab1) should be (meth)acrylamide, especially acrylamide.

According to the invention, the copolymer used further comprises at least one hydrophilic, monoethylenically unsaturated anionic monomer (Ab2) which comprises at least one acidic group selected from the group of —COOH, —$SO_3H$ and —$PO_3H_2$ and salts thereof. Preference is given to monomers comprising COOH groups and/or —$SO_3H$ groups, particular preference to monomers comprising —$SO_3H$ groups. The monomers may of course also be the salts of the acidic monomers. Suitable counterions comprise especially alkali metal ions such as $Li^+$, $Na^+$ or $K^+$, and ammonium ions such as $NH_4^+$ or ammonium ions with organic radicals.

Examples of monomers comprising COOH groups comprise acrylic acid, methacrylic acid, crotonic acid, itaconic acid, maleic acid or fumaric acid. Preference is given to acrylic acid.

Examples of monomers comprising sulfo groups comprise vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid. Preference is given to vinylsulfonic acid, allylsulfonic acid or 2-acrylamido-2-methylpropanesulfonic acid, and particular preference to 2-acrylamido-2-methylpropanesulfonic acid.

Examples of monomers comprising phospho groups comprise vinylphosphonic acid, allylphosphonic acid, N-(meth)acrylamidoalkylphosphonic acids or (meth)acryloyloxyalkylphosphonic acids, preference being given to vinylphosphonic acid.

For the sake of completeness, it should be mentioned that the monomers (Ab1) can be hydrolyzed at least partly to (meth)acrylic acid under some circumstances in the course of preparation and use. The copolymers used in accordance with the invention may accordingly comprise (meth)acrylic acid units, even if no (meth)acrylic acid units at all have been used for the synthesis. The tendency to hydrolysis of the (Ab1) monomers decreases with increasing content of sulfo groups. Accordingly, the presence of sulfo groups in the copolymer used in accordance with the invention is advisable.

The copolymers used in accordance with the invention may additionally optionally comprise at least one monoethylenically unsaturated, cationic monomer (Ab3) having ammonium ions.

Suitable cationic monomers (Ab3) comprise especially monomers having ammonium groups, especially ammonium derivatives of N-(ω-aminoalkyl)(meth)acrylamides or ω-aminoalkyl(meth)acrylic esters.

More particularly, monomers (Ab3) having ammonium groups may be compounds of the general formulae $H_2C=C(R^8)$—CO—$NR^9$—$R^{10}$—$NR^{11}{}_3{}^+X^-$ (Va) and/or $H_2C=C(R^8)$—COO—$R^{10}$—$NR^{11}{}_3{}^+X^-$ (Vb). In these formulae, $R^8$ is H or methyl, $R^9$ is H or a $C_1$-$C_4$-alkyl group, preferably H or methyl, and $R^{10}$ is a preferably linear $C_1$-$C_4$-alkylene group, for example a 1,2-ethylene group —$CH_2$—$CH_2$— or a 1,3-propylene group —$CH_2$—$CH_2$—$CH_2$—.

The $R^{11}$ radicals are each independently $C_1$-$C_4$-alkyl radicals, preferably methyl, or a group of the general formula —$R^{12}$—$SO_3H$ where $R^{12}$ is a preferably linear $C_1$-$C_4$-alkylene group or a phenyl group, with the proviso that generally not more than one of the $R^{11}$ substituents is a substituent having sulfo groups. More preferably, the three $R^{11}$ substituents are methyl groups, i.e. the monomer has a —$N(CH_3)_3{}^+$ group. $X^-$ in the above formula is a monovalent anion, for example $Cl^-$. $X^-$ may of course also be a corresponding fraction of a polyvalent anion, though this is not preferred. Examples of preferred monomers (Ab3) of the general formula (Va) or (Vb) comprise salts of 3-trimethylammoniopropyl(meth)acrylamides or 2-trimethylammonioethyl(meth)acrylates, for example the corresponding chlorides such as 3-trimethylammoniopropylacrylamide chloride (DIMAPAQUAT) and 2-trimethyl-ammoniomethylmethacrylate chloride (MADAME-QUAT).

The copolymers used in accordance with the invention may additionally also comprise further monoethylenically unsaturated hydrophilic monomers (Ab4) different than the hydrophilic monomers (Ab1), (Ab2) and (Ab3). Examples of such monomers comprise monomers comprising hydroxyl groups and/or ether groups, for example hydroxyethyl (meth)acrylate, hydroxypropyl (meth)acrylate, allyl alcohol, hydroxyvinyl ethyl ether, hydroxyvinyl propyl ether, hydroxyvinyl butyl ether, or compounds of the formula $H_2C=C(R^1)$—COO—$(-CH_2-CH(R^{13})-O-)_b$—$R^{14}$ (VIa) or $H_2C=C(R^1)$—O—$(-CH_2-CH(R^{13})-O-)_b$—$R^{14}$ (VIb), where $R^1$ is as defined above and b is a number from 2 to 200, preferably 2 to 100. The $R^{13}$ radicals are each independently H, methyl or ethyl, preferably H or methyl, with the proviso that at least 50 mol % of the $R^{13}$ radicals are H. Preferably at least 75 mol % of the $R^{13}$ radicals are H, more preferably at least 90 mol %, and they are most preferably exclusively H. The $R^{14}$ radical is H, methyl or ethyl, preferably H or methyl. Further examples of monomers (Ab4) comprise N-vinyl derivatives, for example N-vinylformamide, N-vinylacetamide, N-vinylpyrrolidone or N-vinylcaprolactam, and vinyl esters, for example vinyl formate or vinyl acetate. N-Vinyl derivatives can be hydrolyzed after polymerization to give vinylamine units, and vinyl esters to give vinyl alcohol units.

The amount of all hydrophilic monomers (Ab) in the inventive copolymer is, in accordance with the invention, 85 to 99.9% by weight, based on the total amount of all monomers in the copolymer, preferably 90 to 99.8% by weight.

The amount of the uncharged, hydrophilic monomers (Ab1) here is generally 30 to 95% by weight, preferably 30 to 85% by weight and more preferably 30 to 70% by weight, based on the total amount of all monomers used.

When the copolymer comprises only uncharged monomers (Ab1) and anionic monomers (Ab2), it has been found to be useful to use the uncharged monomers (Ab1) in an amount of 30 to 95% by weight and the anionic monomers (Ab2) in an amount of 4.9 to 69.9% by weight, each amount being based on the total amount of all monomers used. In this embodiment, the monomers (Ab1) are preferably used in an amount of 30 to 80% by weight and the anionic monomers (Ab2) in an amount of 19.9 to 69.9% by weight, and the monomers (Ab1) are more preferably used in an amount of 40 to 70% by weight and the anionic monomers (Ab2) in an amount of 29.9 to 59.9% by weight When the copolymer comprises uncharged monomers (Ab1), anionic monomers (Ab2) and cationic monomers (Ab3), it has been found to be useful to use the uncharged monomers (Ab1) in an amount of 30 to 95% by weight, and the anionic (Ab2) and cationic (Ab3) monomers together in an amount of 4.9 to 69.9% by weight, with the proviso that the molar (Ab2)/(Ab3) ratio is 0.7 to 1.3. The molar (Ab2)/(Ab3) ratio is preferably 0.8 to 1.2 and, for example, 0.9 to 1.1. This measure makes it possible to obtain copolymers which are particularly insensitive to salt burden. In this embodiment, the monomers (Ab1) are used in an amount of 30 to 80% by weight, and the anionic and cationic monomers (Ab2)+(Ab3) together in an amount of 19.9 to 69.9% by weight, and the monomers (Ab1) are more preferably used in an amount of 40 to 70% by weight and the anionic and cationic monomers (Ab2)+(Ab3) together in an amount of 29.9 to 59.9% by weight, where the molar ratio already mentioned should be observed in each case.

Monomers (Ac)

In addition to the hydrophilic monomers (Aa) and (Ab), the inventive copolymers may optionally comprise ethylenically unsaturated monomers different than the monomers (Aa) and (Ab), preferably monoethylenically unsaturated monomers (Ac). Of course, it is also possible to use mixtures of a plurality of different monomers (Ac).

Such monomers can be used for fine control of the properties of the copolymer used in accordance with the invention. If present at all, the amount of such optionally present monomers (Ac) may be up to 14.9% by weight, preferably up to 9.9% by weight, more preferably up to 4.9% by weight, based in each case on the total amount of all monomers. Most preferably, no monomers (Ac) are present.

The monomers (Ac) may, for example, be monoethylenically unsaturated monomers which have more hydrophobic character than the hydrophilic monomers (Ab) and which are accordingly water-soluble only to a minor degree. In general, the solubility of the monomers (Ac) in water at room temperature is less than 50 g/l, especially less than 30 g/l. Examples of such monomers comprise N-alkyl- and N,N'-dialkyl(meth)acrylamides, where the number of carbon atoms in the alkyl radicals together is at least 3, preferably at least 4. Examples of such monomers comprise N-butyl(meth)acrylamide, N-cyclohexyl(meth)acrylamide or N-benzyl (meth)acrylamide.

Preparation of the Hydrophobically Associating Copolymers

The copolymers used in accordance with the invention can be prepared by methods known in principle to those skilled in the art, by free-radical polymerization of the monomers (Aa), (Ab) and optionally (Ac), for example by solution or gel polymerization in the aqueous phase.

For polymerization, the monomers (Aa), (Ab), optionally (Ac), initiators and optionally further assistants for polymerization are used in an aqueous medium.

In a preferred embodiment, the preparation is undertaken by means of gel polymerization in the aqueous phase. For gel polymerization, a mixture of the monomers (Aa), (Ab) and optionally (Ac), initiators and optionally further assistants with water or an aqueous solvent mixture is first provided. Suitable aqueous solvent mixtures comprise water and water-miscible organic solvents, where the proportion of water is generally at least 50% by weight, preferably at least 80% by weight and more preferably at least 90% by weight. Organic solvents in this context include especially water-miscible alcohols such as methanol, ethanol or propanol. Acidic monomers can be fully or partly neutralized before the polymerization. The concentration of all components except the solvents in the course of the polymerization is typically approx. 20 to 60% by weight, preferably approx. 30 to 50% by weight. The polymerization should especially be performed at a pH in the range from 5.0 to 7.5 and preferably at a pH of 6.0.

Polymerization in the Presence of a Nonpolymerizable, Interface-Active Compound

In a preferred embodiment of the invention, the copolymers used are prepared in the presence of at least one nonpolymerizable, surface-active compound (T).

The nonpolymerizable, surface-active compound (T) is preferably at least one nonionic surfactant, but anionic and cationic surfactants are also suitable to the extent that they do not take part in the polymerization reaction. They may especially be surfactants, preferably nonionic surfactants, of the general formula $R^{13}$—Y' where $R^{13}$ is a hydrocarbyl radical having 8 to 32, preferably 10 to 20 and more preferably 12 to 18 carbon atoms, and Y' is a hydrophilic group, preferably a nonionic hydrophilic group, especially a polyalkoxy group.

The nonionic surfactant is preferably an ethoxylated long-chain aliphatic alcohol which may optionally comprise aromatic components.

Examples include: $C_{12}C_{14}$-fatty alcohol ethoxylates, $C_{16}C_{18}$-fatty alcohol ethoxylates, $C_{13}$-oxo alcohol ethoxylates, $C_{10}$-oxo alcohol ethoxylates, $C_{13}C_{15}$-oxo alcohol ethoxylates, $C_{10}$-Guerbet alcohol ethoxylates and alkylphenol ethoxylates. Useful compounds have especially been found to be those having 5 to 20 ethyleneoxy units, preferably 8 to 18 ethyleneoxy units. It is optionally also possible for small amounts of higher alkyleneoxy units to be present, especially propyleneoxy and/or butyleneoxy units, though the amount in the form of ethyleneoxy units should generally be at least 80 mol % based on all alkyleneoxy units.

Especially suitable are surfactants selected from the group of the ethoxylated alkylphenols, the ethoxylated, saturated iso-C13-alcohols and/or the ethoxylated C10-Guerbet alcohols, where in each case 5 to 20 ethyleneoxy units, preferably 8 to 18 ethyleneoxy units, are present in alkoxy radicals.

Surprisingly, the addition of nonpolymerizable, interface-active compounds (T) during the polymerization leads to a distinct improvement in performance properties of the copolymer in polymer flooding. More particularly, the thickening action is increased and the gel content of the copolymer is also reduced. This effect can probably be explained as follows, without any intention that the invention thus be tied to this explanation. In the case of polymerization without presence of a surfactant, the hydrophobically associating comonomers (Aa) form micelles in the aqueous reaction medium. In the polymerization, this leads to blockwise incorporation of the hydrophobically associating regions into the polymer. If, in accordance with the invention, an additional surface-active compound is present in the preparation of the copolymers, mixed micelles form. These mixed micelles comprise polymerizable and nonpolymerizable components. As a result, the hydrophobically associating monomers are then incorporated in relatively short blocks. At the same time, the number of these relatively short blocks is greater per polymer chain. Thus, the structure of the copolymers prepared in the presence of a surfactant differs from those without the presence of a surfactant.

The nonpolymerizable, interface-active compounds (T) can generally be used in an amount of 0.1 to 5% by weight, based on the amount of all monomers used.

The weight ratio of the nonpolymerizable, interface-active compounds (T) used to the monomers (Aa) is generally 4:1 to 1:4, preferably 2:1 to 1:2, more preferably 1.5:1 to 1:1.5 and, for example, approx. 1:1.

Performance of the Polymerization

For the polymerization, the components required are first mixed with one another. The sequence with which the components are mixed for polymerization is unimportant; what is important is merely that, in the preferred polymerization method, the nonpolymerizable, interface-active compound (T) is added to the aqueous polymerization medium before the initiation of the polymerization.

The mixture is subsequently polymerized thermally and/or photochemically, preferably at −5° C. to 80° C. If polymerization is effected thermally, preference is given to using polymerization initiators which can initiate the polymerization even at comparatively low temperature, for example redox initiators. The thermal polymerization can be undertaken even at room temperature or by heating the mixture, preferably to temperatures of not more than 50° C. The photochemical polymerization is typically undertaken at temperatures of −5 to 10° C. It is also possible to combine photochemical and thermal polymerization with one another, by adding both initiators for the thermal and photochemical polymerization to the mixture. In this case, the polymerization is first initiated photochemically at low temperatures, preferably −5 to +10° C. The heat of reaction released heats the mixture, which additionally initiates the thermal polymerization. By means of this combination, it is possible to achieve a conversion of more than 99%.

In a further preferred embodiment of the polymerization, it is also possible to perform the reaction with a mixture of a redox initiator system and a thermal initiator which does not decompose until relatively high temperatures. This may, for example, be a water-soluble azo initiator which decomposes within the temperature range from 40° C. to 70° C. The polymerization here is at first initiated at low temperatures of, for example, 0 to 10° C. by the redox initiator system. The heat of reaction released heats the mixture, and this additionally initiates the polymerization by virtue of the initiator which does not decompose until relatively high temperatures.

The gel polymerization is generally effected without stirring. It can be effected batchwise by irradiating and/or heating the mixture in a suitable vessel at a layer thickness of 2 to 20 cm. The polymerization gives rise to a solid gel. The polymerization can also be effected continuously. For this purpose, a polymerization apparatus is used, which possesses a conveyor belt to accommodate the mixture to be polymerized. The conveyor belt is equipped with devices for heating and/or for irradiating with UV radiation. In this method, the mixture is poured onto one end of the belt by means of a suitable apparatus, the mixture is polymerized in the course of transport in belt direction, and the solid gel can be removed at the other end of the belt.

The gel obtained is preferably comminuted and dried after the polymerization. The drying should preferably be effected at temperatures below 100° C. To prevent conglutination, it is possible to use a suitable separating agent for this step. This gives the hydrophobically associating copolymer as granules or powder.

Further details of the performance of a gel polymerization are disclosed, for example in DE 10 2004 032 304 A1, paragraphs [0037] to [0041].

Since the polymer powder or granules obtained are generally used in the form of an aqueous solution in the course of application at the site of use, the polymer has to be dissolved in water on site. This may result in undesired lumps with the high molecular weight polymers described. In order to avoid this, it is possible to add an assistant which accelerates or improves the dissolution of the dried polymer in water to the inventive polymers as early as in the course of synthesis. This assistant may, for example, be urea.

The resulting copolymers (A) generally have a weight-average molecular weight $M_W$ of $1*10^6$ g/mol to $30*10^6$ g/mol, preferably $5*10^6$ g/mol to $20*10^6$ g/mol.

Preferred Copolymers

Copolymers particularly preferred for execution of the process comprise monomers (Aa) of the general formula $H_2C=CH-O-(CH_2)_{n'}-O-(-CH_2-CH_2-O-)_k-(-CH_2-CH(R^4)-O-)_l-H$ (Ia) where n' is 2 to 6, preferably 2 to 4 and more preferably 4. $R^4$ in the preferred variant is a hydrocarbyl radical having 3 to 10 carbon atoms, especially an n-propyl radical. In addition, in formula (Ia), k is a number from 20 to 30 and l is a number from 6 to 20, preferably 8 to 18. The amount of the monomers (Aa) of the formula (Ia) is 0.2 to 5% by weight, preferably 0.5 to 2% by weight. As monomer (Ab1), the preferred copolymer comprises 40 to 60% by weight of acrylamide and, as monomer (Ab2), 35 to 55% by weight of a monomer (Ab2) having sulfo groups, preferably 2-acrylamido-2-methylpropanesulfonic acid or salts thereof.

Further copolymers preferred for execution of the process likewise comprise 0.2 to 5% by weight, preferably 0.5 to 2% by weight, of monomers (Aa) of the general formula (Ia) and 30 to 40% by weight of acrylamide. They additionally comprise 25 to 35% by weight of at least one monomer (Ab2) having sulfo groups, preferably 2-acrylamido-2-methylpropanesulfonic acid or salts thereof, and 25 to 35% by weight of at least one cationic monomer having ammonium ions, preferably salts of 3-trimethylammoniopropyl(meth)acrylamides and 2-trimethylammonioethyl(meth)acrylates.

Surfactants (B) Used

The aqueous formulation used in accordance with the invention further comprises one or more nonionic, anionic or zwitterionic surfactants (B).

These may in principle be any nonionic, anionic or zwitterionic surfactants, preferably nonionic and/or anionic surfactants, provided that they are suitable in principle for tertiary mineral oil production. The person skilled in the art is aware of corresponding surfactants. Suitable surfactants for tertiary mineral oil production comprise, as hydrophobic molecular moieties, especially hydrocarbyl radicals, preferably aliphatic hydrocarbyl radicals having 10 to 36 carbon atoms, preferably 12 to 36 carbon atoms and more preferably 16 to 36 carbon atoms.

Examples of such surfactants comprise anionic surfactants having sulfonic acid groups, such as olefinsulfonates such as α-olefinsulfonates or i-olefinsulfonates, paraffinsulfonates or alkylbenzenesulfonates, nonionic surfactants such as alkyl polyalkoxylates, especially alkyl polyethoxylates, alkyl polyglucosides. One example of zwitterionic surfactants are alkylamidopropyl betaines. In addition, the surfactants may also be those which comprise both nonionic hydrophilic groups and anionic hydrophilic groups, for example alkyl ether sulfonates, alkyl ether sulfates or alkyl ether carboxylates.

In addition, the surfactants may also be oligomeric or polymeric surfactants. Examples of such polymeric surfactants comprise amphiphilic block copolymers which comprise at least one hydrophilic and at least one hydrophobic block. Examples comprise polypropylene oxide-polyethylene oxide block copolymers, polyisobutene-polyethylene oxide block copolymers, and comb polymers having polyethylene oxide side chains and a hydrophobic main chain, where the main chain preferably comprises essentially olefins or (meth)acrylates as structural units.

In a preferred embodiment of the invention, the surfactants are anionic and/or nonionic surfactants selected from the group of surfactants (Ba), (Bb) and (Bc).

Surfactants (Ba)

The surfactants (Ba) are preferably nonionic surfactants of the general formula $R^{15}$—O—$(R^{16}O)_a$—H (VII).

In this formula, $R^{15}$ is a saturated, unsaturated or aromatic, straight-chain, cyclic and/or branched hydrocarbyl radical having 10 to 36 carbon atoms, preferably 12 to 36 carbon atoms and more preferably 16 to 36 carbon atoms.

The $R^{16}O$ radicals are each independently alkyleneoxy groups having 2 to 4 carbon atoms, for example 1,2-ethyleneoxy groups —$CH_2$—$CH_2$—O—, 1,2-propyleneoxy groups —$CH_2$—$CH(CH_3)$—O— or 1,2-butyleneoxy groups —$CH_2$—$CH(C_2H_5)$—O—, with the proviso that at least 50 mol %, preferably at least 70 mol %, of the $R^{16}O$ radicals are 1,2-ethyleneoxy groups.

The number a here is a number from 3 to 100, preferably 8 to 80, more preferably 10 to 60 and most preferably 12 to 40.

When a plurality of different —$R^{16}O$— radicals are present, they may be arranged randomly, alternately or in blocks, preference being given to a block arrangement. In the case of a block arrangement, it is preferred that the $R^{15}$ radical is attached firstly to propyleneoxy and/or butyleneoxy groups, and ethyleneoxy groups form a terminal block.

Surfactants of the general formula (VII) can be obtained in a manner known in principle by alkoxylation of the appropriate alcohols $R^{15}$—OH with the appropriate alkylene oxides, for example ethylene oxide, propylene oxide or butylene oxide. The person skilled in the art is aware that the alkoxylation of alcohols proceeds randomly. The number a mentioned should thus be understood as an average value.

Preferred surfactants (VII) have the formula $R^{15}$—O—$(CH_2CH_2O)_b$H, where $R^{15}$ is a branched aliphatic radical having 12 to 24 carbon atoms, preferably 12 to 18 carbon atoms, especially the radical of an oxo alcohol.

Surfactants (Bb)

The surfactants (Bb) are anionic surfactants of the general formula $R^{15}$—O—$(R^{17}O)_b$—$R^{18}$—Y (VIII).

In formula (VIII), $R^{15}$ is as already defined.

The $R^{17}O$ radicals are each independently alkyleneoxy groups having 2 to 4 carbon atoms, with the proviso that at least 30 mol %, preferably at least 50 mol %, of the $R^{17}O$ radicals are a 1,2-ethylene group and/or a 1,2-propylene group.

$R^{18}$ in formula (VIII) is a single bond or a divalent hydrocarbyl group having 1 to 10 carbon atoms, especially a divalent aliphatic hydrocarbyl group having 1 to 10 and preferably 1 to 4 carbon atoms. It is preferably a group selected from the group of methylene groups —$CH_2$—, 1,2-ethylene groups —$CH_2$—$CH_2$—, 1,2-propylene groups —$CH_2$—CH($CH_3$)— or —CH($CH_3$)—$CH_2$— or 1,3-propylene groups —$CH_2$—$CH_2$—$CH_2$—.

b is a number from 1 to 100, preferably 2 to 60, more preferably 5 to 30 and, for example, 8 to 20.

Y is an acidic group or a salt thereof, selected from the group of sulfonate groups, sulfate groups, phosphonate groups, phosphoric acid groups or carboxyl groups. When it is a salt, the salts may be alkali metal salts, especially sodium salts or ammonium salts. It is preferably sulfonate, sulfate or a carboxyl group.

The preparation of surfactants of the general formula (VIII) is known in principle to those skilled in the art. In a first step, as already described, alcohols of the general formula $R^{15}$OH can be alkoxylated. The alkoxylated alcohols obtained are then modified with the acidic Y groups, the type of linkage $R^{18}$ depending on the selected method for modification. In the case of a sulfate group, it is possible, for example, to employ the reaction of the alkoxylated alcohol with sulfuric acid, chlorosulfonic acid or sulfur trioxide in a falling film reactor. In this case, $R^{18}$ is a single bond. In the case of a sulfonate group, it is possible, for example, to employ the reaction with propane sultone ($R^{18}$=—$CH_2$—$CH_2$—$CH_2$—) or butane sultone ($R^{18}$=—$CH_2$—$CH_2$—$CH_2$—$CH_2$—) or with vinylsulfonic acid ($R^{18}$=—$CH_2$—$CH_2$—) or the sodium salt thereof. In the case of a carboxylate group, it is possible, for example, to employ the oxidation of the alcohol with oxygen and subsequent neutralization, or the reaction with sodium chloroacetate. Further details for the modification of nonionic surfactants with acidic groups can be found, for example, in WO 2009/124922, page 21 lines 9 to 39, page 22 line 27 to page 23 line 2, and page 23 lines 30 to 34.

Preferred surfactants (VIII) have the formula $R^{15}$—O—$(R^{17}O)_b$—$SO_3M$ (VIIIa) where M is H or an alkali metal or ammonium ion, $R^{17}O$ is a propyleneoxy group, b is a number from 6 to 15 and b is a linear aliphatic hydrocarbyl radical having 16 to 18 carbon atoms.

Surfantants (Bc)

The surfactants (Bc) are star-shaped nonionic surfactants of the general formula $R^{19}[$—(O—(CH—CH($R^{20}$)—O)$_c$—$(CH_2CH_2O)_d$—(CH—CH($R^{20}$)—O)$_e$—H]$_f$(IX).

In formula (IX), f is a number from 3 to 9, preferably from 3 to 6 and more preferably 3 or 4.

$R^{19}$ is an f-valent hydrocarbyl radical, especially an aliphatic hydrocarbyl radical having 3 to 15 carbon atoms, preferably 3 to 10 carbon atoms.

$R^{20}$ is an aliphatic hydrocarbyl radical having 1 to 3 carbon atoms, especially 1 or 2 carbon atoms, i.e. the —(CH—CH($R^{20}$)—O)— units are preferably prooxy or butoxy radicals.

In the formula (IX), c is a number from 0 to 2, preferably 0 to 1. In addition, d is a number from 2 to 50, preferably 2 to 30 and more preferably 3 to 20, and e is a number from 2 to 50, preferably 2 to 30 and more preferably 4 to 35.

The surfactants (Bc) thus comprise a central carbon group which has at least 3 polyalkoxy groups as side groups. The —(CH—CH($R^{20}$)—O)$_c$—, —(CH$_2$CH$_2$O)$_d$— and —(CH—CH($R^{20}$)—O)$_e$— groups are arranged in the sequence mentioned. They thus have a block structure. A polyalkoxy group functions as the terminal group. The polyalkoxy groups —(CH—CH($R^{20}$)—O)$_c$— are only present optionally here.

The surfactants (IX) can be prepared in a manner known in principle by multistage alkoxylation of at least trihydric alcohols R(OH)$_f$, for example by base-catalyzed alkoxylation in xylene. Suitable at least trihydric alcohols comprise, for example, glycerol, diglycerol, triglycerol, trimethylolethane, trimethylolpropane, 1,2,4-butanetriol, pentaerythritol, bispentaerythritol or trispentaerythritol.

Aqueous Formulation

The aqueous formulation used to execute the process comprises, in addition to water, at least the hydrophobically associating copolymer (A) described and at least one surfactant (B) are used. It is of course also possible to use mixtures of different hydrophobically associating copolymers (A) and mixtures of a plurality of surfactants (B).

The formulation can be made up in fresh water, or else in water comprising salts. Of course, it can also comprise mixtures of different salts. For example, it is possible to use sea water to make up the aqueous formulation, or it is possible to use produced formation water, which is reused in this manner. In the case of offshore production platforms, the formulation is generally made up in sea water. In the case of onshore production units, the polymer can, for example, first be dissolved in fresh water, and the resulting solution can be diluted to the desired use concentration with formation water.

In addition to water, it is also possible for small amounts of water-miscible organic solvents, for example water-miscible alcohols, to be present. If present at all, the amount thereof should, however, be less than 20% by weight based on the sum of all solvents used, preferably less than 10% by weight, more preferably less than 5% by weight, and more preferably no organic solvent should be used in addition.

The salts may especially be alkali metal salts and alkaline earth metal salts. Examples of typical cations comprise Na$^+$, K$^+$, Mg$^{2+}$ or Ca$^{2+}$, and examples of typical anions comprise chloride, bromide, hydrogencarbonate, sulfate or borate.

When the formulation comprises salts, generally at least one or more than one alkali metal ion, especially at least Na$^+$, is present. In addition, it is also possible for alkaline earth metal ions to be present, where the weight ratio of alkali metal ions/alkaline earth metal ions is generally ≥2, preferably ≥3. The anions present are generally at least one or more than one halide ion, especially at least Cl$^-$. In general, the amount of Cl$^-$ is at least 50% by weight, preferably at least 80% by weight, based on the sum of all anions.

The total amount of all salts in the aqueous formulation may be up to 350000 ppm (parts by weight), based on the sum of all components of the formulation. It should as far as possible not be more than 200000 ppm.

The aqueous formulation may of course also comprise further components. For example, these may be additions of bases, such as alkali metal hydroxides or sodium carbonate. Further examples of additional components comprise complexing agents, biocides, stabilizers or inhibitors.

The formulation can preferably be prepared by initially charging the water, adding the components successively to the water and mixing them. The copolymer (A) can be added to the water as a powder.

According to the invention, the concentration of the copolymers (A) in the formulation is 0.01 to 2% by weight based on the sum of all components of the aqueous formulation. The amount is preferably 0.05 to 0.5% by weight, more preferably 0.04 to 0.2% by weight and, for example, approx. 0.1% by weight.

The amount of the surfactants (B) in the formulation is 0.005 to 1% by weight, preferably 0.05 to 0.5% by weight. The amount can be judged by the person skilled in the art according to the desired end use.

Used in small amounts, the surfactants (B) can be used in particular with the purpose of increasing the viscosity of the formulation. For this purpose, amounts of surfactant of 0.005% by weight to 0.05% by weight, preferably 0.05 to 0.025% by weight, have been found to be useful.

Used in greater amounts, surfactants can promote, in a manner known in principle, the additional exploitation of the deposit by the action of the surfactants. For this purpose, amounts of 0.05% by weight to 1% by weight, preferably 0.075 to 0.5% by weight and more preferably 0.1 to 0.5% by weight, have been found to be useful. It is clear to the person skilled in the art that the transitions between the two phenomena are fluid and that both effects may also occur simultaneously.

The weight ratio of the copolymers to the surfactants (A)/(B) is preferably 1:10 to 20:1, preferably 1:1 to 10:1 and more preferably 2:1 to 5:1.

The concentration of the copolymer is fixed such that the aqueous formulation has the desired viscosity for the end use. The viscosity of the formulation should be at least 5 mPas (measured at 25° C. and a shear rate of 7 s$^{-1}$), preferably at least 10 mPas.

Particularly preferred copolymers (A) and surfactants (B) for the aqueous formulation and for execution of the process have already been specified above.

Processes for Mineral Oil Production

To execute the process according to the invention, at least one production borehole and at least one injection borehole are sunk into the mineral oil deposit. In general, a deposit is provided with several injection boreholes and with several production boreholes.

An aqueous formulation of the copolymer described is injected into the mineral oil deposit through the at least one injection borehole, and mineral oil is withdrawn from the deposit through at least one production borehole. The term "mineral oil" in this context of course does not only mean single-phase oil, but the term also comprises the customary crude oil-water emulsions. As a result of the by the formulation injected, the mineral oil flows in the direction of the production borehole and is produced via the production borehole.

In a preferred embodiment of the process, the process according to the invention is performed after water flooding of the deposit. For this purpose, at first only water or salt-containing water is injected into the mineral oil formation through the said injection boreholes, and hence mineral oil is produced. This can proceed until significant watering out of production is observed. "Watering out" of production is understood by the person skilled in the art to mean that the proportion of water in the oil-water mixture produced increases with increasing duration of water flooding. The cause of this is that water flows preferentially through already exploited regions of the mineral oil deposit with low flow resistance with increasing duration of water flooding.

In a further embodiment of the invention, the production can be continued after the injection of the aqueous formulation composed of components (A) and (B) with water flooding.

The process according to the invention can in principle be applied to mineral oil deposits at any temperature. Typical deposit temperatures are in the range from 20° C. to 150° C. In particular, the deposit temperature may be 35° C. to 120° C., preferably 40° C. to 90° C., more preferably 45° C. to 75° C. and, for example, 50° C. to 70° C.

It is clear to the person skilled in the art that a mineral oil deposit may also have a certain temperature distribution. The deposit temperature mentioned relates to the region of the deposit between the injection and production boreholes which is covered by the polymer flooding. Methods of determining the temperature distribution of a mineral oil deposit are known in principle to those skilled in the art. The temperature distribution is generally undertaken from temperature measurements at determined points in the formation in combination with simulation calculations, which take account, inter alia, of amounts of heat introduced into the formation and the amounts of heat removed from the formation.

The process according to the invention can be employed especially in the case of mineral oil deposits with an average permeability of 10 mD to 4 D, preferably 100 mD to 2 D and more preferably 200 mD to 1 D. The permeability of a mineral oil formation is reported by the person skilled in the art in the unit "darcy" (abbreviated to "D" or "mD" for "millidarcies") and can be determined from the flow rate of a liquid phase in the mineral oil formation as a function of the pressure differential applied. The flow rate can be determined in core flooding tests with drill cores taken from the formation. Details on this subject can be found, for example, in K. Weggen, G. Pusch, H. Rischmüller in "*Oil and Gas*", pages 37 ff., *Ulmann's Encyclopedia of Industrial Chemistry*, online edition, Wiley-VCH, Weinheim 2010. It is clear to the person skilled in the art that the permeability in a mineral oil deposit need not be homogeneous and is an average permeability.

The injection of the inventive aqueous formulation can be undertaken by means of customary apparatus. The formulation can be injected into one or more injection boreholes by means of customary pumps. The injection boreholes are typically lined with cemented steel tubes, and the steel tubes are perforated at the desired site. The formulation exits through the perforation from the injection borehole into the mineral oil formation. The pressure applied by means of the pumps, in a manner known in principle, fixes the flow rate of the formulation and hence also the shear stress with which the aqueous formulation enters the formation. The shear stress on entry into the formation can be calculated by the person skilled in the art in a manner known in principle on the basis of the Hagen-Poiseuille law using the area flowed through on entry into the formation, the mean pore radius and the volume flow. The average porosity of the formation can be determined in a manner known in principle by measurements on drill cores. By its nature, the greater the volume flow of aqueous copolymer formulation injected into the formation, the greater the shear stress.

The rate of injection can be fixed by the person skilled in the art according to the conditions in the formation. Preferably, the shear rate on entry of the aqueous polymer formulation into the formation is at least 30 000 s$^{-1}$, preferably at least 60 000 s$^{-1}$ and more preferably at least 90 000 s$^{-1}$.

By means of the aqueous formulation used, the mineral oil yield can be enhanced as in the case of conventional polymer flooding. By virtue of the viscosity of the water phase being matched to the viscosity of the oil phase, there is prevention or at least delay of breakthrough of the aqueous phase to production borehole, and watering out of the production. The front of the aqueous phase advancing from the injection borehole becomes more homogeneous, "fingering" is avoided, and hence the oil yield is enhanced. By means of the aqueous formulation composed of copolymer (A) and surfactants (B) used in accordance with the invention, it is possible, however, also to achieve additional effects compared to the use of a formulation comprising only the copolymer (A). Firstly, the viscosity of the formulation can be increased by the addition of surfactant, and the use of the surfactant also allows additional mineral oil to be mobilized in the formation and produced.

The examples which follow are intended to illustrate the invention in detail:

Monomers (Aa) Used

Monomer M1

Hydroxybutyl Vinyl Ether Alkoxylate with 22 EO Units and 12 PeO Units

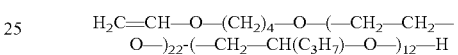

A 1 L stirred stainless steel autoclave is initially charged with 44.1 g of hydroxybutyl vinyl ether. Subsequently, 3.12 g of KOMe (32% in MeOH) are metered in and the methanol is drawn off at 80° C. and approx. 30 mbar. This is followed by heating to 140° C., purging of the reactor with nitrogen and establishment of a nitrogen pressure of 1.0 bar. Then 368 g of EO are metered in within approx. 3 h. After continued reaction at 140° C. for a half hour, the reactor is cooled to 125° C., and a total of 392 g of pentene oxide are metered in over the course of 3.5 h. The reaction continues overnight.

The product has an OH number of 31.9 mg KOH/g (theory: 26.5 mg KOH/g). The OH number is determined by means of the ESA method.

Preparation of the Copolymers (A)

Preparation of a Copolymer From 2% by Weight of Monomer M1, 50% by Weight of Acrylamide and 48% by Weight of 2-acrylamido-2-methylpropanesulfonic acid A plastic bucket with magnetic stirrer, pH meter and thermometer is initially charged with 121.2 g of a 50% aqueous solution of NaATBS (2-acrylamido-2-methylpropanesulfonic acid, sodium salt), and then 155 g of distilled water, 0.6 g of a defoamer (Surfynol® DF-58), 0.2 g of a silicone defoamer (Baysilon® EN), 2.3 g of monomer M1, 114.4 g of a 50% aqueous solution of acrylamide, 1.2 g of pentasodium diethylenetriaminepentaacetate (complexing agent, as a 5% aqueous solution) and 2.4 g of a nonionic surfactant (nonylphenol, alkoxylated with 10 units of ethylene oxide) are added successively.

After adjusting the pH with a 20% or 2% sulfuric acid solution to a value of 6 and adding the rest of the water, the monomer solution is adjusted to the start temperature of 5° C. The total amount of water is such that—after the polymerization—a solids concentration of approx. 30 to 36% by weight is attained. The solution is transferred to a thermos flask, a temperature sensor for the temperature recording is provided and the solution is purged with nitrogen for 30 minutes. The polymerization is then initiated by adding 1.6 ml of a 10% aqueous solution of a water-soluble cationic azo initiator 2,2'-azobis(2-amidinopropane)dihydrochloride (Wako V-50), 0.12 ml of a 1% aqueous solution of tert-butyl hydroperoxide and 0.24 ml of a 1% sodium sulfite solution. After the initiators have been added, the temperature rises to approx. 80° C. within 15 to 30 min. After 30 min, the reaction vessel is placed into a drying cabinet at approx. 80° C. for approx. 2 h to complete the polymerization. The total duration of the polymerization is approx. 2 h to 2.5 h.

A gel block is obtained, which, after the polymerization has ended, is comminuted with the aid of a meat grinder. The gel granules obtained are dried in a fluidized bed dryer at 55° C. for two hours. This gives white, hard granules which are converted to a pulverulent state by means of a centrifugal mill. This gives a copolymer with a weight-average molecular weight of approx. $1*10^6$ g/mol to $30*10^6$ g/mol.

Surfactants Used:
Surfactant 1:
C16C18-7PO sulfate:
Anionic surfactant of the formula: $R-O-(CH_2-CH(CH_3)-O)_7-SO_3H$ based on $C_{16}/C_{18}$ fatty alcohols (i.e. R comprises linear aliphatic $C_{16}$- to $C_{18}$-hydrocarbyl radicals).
Surfactant 2:
Star-shaped surfactant of the formula

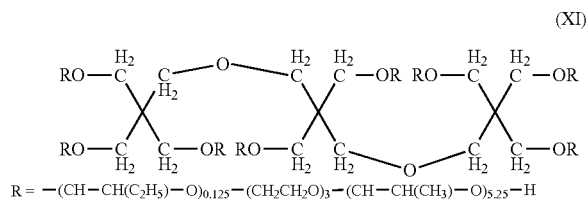

It is obtainable by stepwise alkoxylation of 1 mol of trispentaerythritol (an 8-hydric alcohol, obtainable by condensation of 3 mol of pentaerythritol) with 1 mol of butylene oxide, 24 mol of ethylene oxide and 42 mol of propylene oxide using a basic catalyst in xylene as a solvent.

Surfactant 3 (Noninventive):
Cationic surfactant: Dodecyltrimethylammonium bromide
Salt-Containing Media Used:
For the tests, the following salt solutions were used.
Salt Solution 1: Deposit Water (Synthetic)
Total salinity: 77529 mg/l
$Na^+$ 25091 mg/l, $K^+$ 177 mg/l, $Mg^{2+}$ 979 mg/l, $Ca^{2+}$ 2962 mg/l, $Ba^{2+}$ 61 mg/l, $Sr^{2+}$ 187 mg/l, Mn 0.9 mg/l, $Cl^-$ 47934 mg/l, $HCO_3^-$ 134 mg/l
Alkali metal ion/alkaline earth metal ion ratio: 6.0
Salt Solution 2: Deposit Water (Synthetic):
Total salinity: 185548 mg/l
$Na^+$ 52079 mg/l, $Mg^{2+}$ 2681 mg/l, $Ca^{2+}$ 15383 mg/l, $Cl^-$ 115105 mg/l, borate 117 mg/l, $SO_4^{2-}$ 183 mg/l.
Alkali metal ion/alkaline earth metal ion ratio: 2.9; deposit water with high $Ca^{2+}$ content
Salt Solution 3: Seawater (Synthetic):
Total salinity: approx. 35000 mg/l
$Na^+$ 10692 mg/l, $K^+$ 420 mg/l, $Mg^{2+}$ 1295 mg/l, $Ca^{2+}$ 422 mg/l, $Cl^-$ 19218 mg/l, $HCO_3^-$ 145 mg/l, $SO_4^{2-}$ 2697 mg/l
Alkali metal ion/alkaline earth metal ion ratio: 6.2
The following tests were carried out:

Example 1

A solution of 2000 ppm of the copolymer (A) in salt solution 1 was studied by rheological means at 25° C. once without addition and once with addition of 500 ppm of surfactant 1 (C16C18-7PO sulfate):

Viscosity without surfactant addition: 50 mPas
Viscosity with surfactant addition: 100 mPas
The measurement was effected with a Brookfield LVD-VII+ Pro Ultra at 7.34 $s^{-1}$ at 25° C.

Example 2

A solution of 2000 ppm of the polymer from preparation example 1 in salt solution 2 was studied by rheological means at 60° C. once without addition and once with addition of 500 ppm of surfactant 2:

Viscosity without surfactant addition: 29 mPas
Viscosity with surfactant addition: 69 mPas
The measurement was effected with a Haake RS 80 rheometer at 7 $s^{-1}$ at 60° C.

Comparative Example 1

A solution of 1300 ppm of the polymer from preparation example 1 in salt solution 3 was studied by rheological means at 60° C. once without addition and once with addition of 500 ppm of surfactant 3 (dodecyltrimethylammonium bromide):

Viscosity without surfactant addition: 15 mPas
Viscosity with surfactant addition: <3 mPas
The measurement was effected with a Haake RS 80 rheometer at 7 $s^{-1}$ at 60° C.

The tests show that, with the inventive formulations, the viscosity of aqueous formulation obtained increases significantly as a result of the addition of the surfactant, whereas, in the case of use of the noninventive cationic surfactant, the viscosity of the formulation obtained decreases significantly.

The invention claimed is:
1. A process for mineral oil production, in which an aqueous formulation comprising at least one water-soluble, hydrophobically associating copolymer (A) and at least one surfactant (B) is injected through at least one injection borehole into a mineral oil deposit, and crude oil is withdrawn from the deposit through at least one production borehole, wherein
(A) the water-soluble, hydrophobically associating copolymer comprises
(Aa) 0.1 to 15% by weight of at least one monoethylenically unsaturated, hydrophobically associating monomer (Aa), selected from the group of

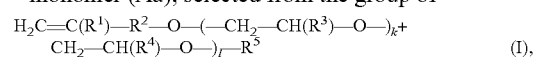

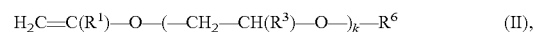

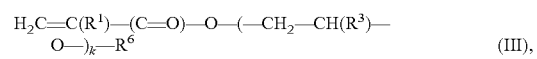

where the $-(-CH_2-CH(R^3)-O-)_k$ and $-(-CH_2-CH(R^4)-O-)_l$ units are arranged in block structure in the sequence shown in formula (I) and the radicals and indices are each defined as follows:
k: a number from 10 to 150,
l: a number from 5 to 25,
$R^1$: H or methyl,
$R^2$: a single bond or a divalent linking group selected from the group of $-(C_nH_{2n})-$ [$R^{2a}$], $-O-(C_{n'}H_{2n'})-$ [$R^{2b}$] and $-C(O)-O-(C_{n''}H_{2n''})-$ [$R^{2c}$], where n, n' and n" are each natural numbers from 1 to 6,
$R^3$: each independently H, methyl or ethyl, with the proviso that at least 50 mol % of the $R^2$ radicals are H,
$R^4$: each independently a hydrocarbyl radical having at least 2 carbon atoms or an ether group of the general formula —CH$_2$—O—R$^{4'}$, where R$^{4'}$ is a hydrocarbyl radical having at least 2 carbon atoms, R$^5$: H or a hydrocarbyl radical having 1 to 30 carbon atoms, R$^6$: an aliphatic and/or aromatic, straight-chain or branched hydrocarbyl radical having 8 to 40 carbon atoms, and also (Ab) 85 to 99.9% by weight of at least one monoethylenically unsaturated, hydrophilic monomers (Ab) different than (Aa), where the monomers (Ab) comprise (Ab1) at least one uncharged, monoethylenically unsaturated, hydrophilic monomer (b1), selected from the group of (meth)acrylamide, N-methyl(meth)acrylamide, N,N'-dimethyl(meth)acrylamide or N-methylol(meth)acrylamide, and (Ab2) at least one anionic, monoethylenically unsaturated, hydrophilic monomer (Ab2) which at least one acidic group selected from the group of —COOH, —SO$_3$H and —PO$_3$H$_2$ and salts thereof, where the proportions are each based on the total amount of all monomers in the copolymer and the copolymer has a weight-average molecular weight M$_w$ of 1*10$^6$ g/mol to 30*10$^6$ g/mol, and wherein (B) the at least one surfactant is a nonionic and/or anionic surfactant which is selected from the group of (Ba) nonionic surfactants of the general formula R$^{15}$—O—(R$^{16}$O)$_a$—H (VII) where the radicals are each defined as follows:

R$^{15}$: a C$_{10}$- to C$_{36}$-hydrocarbyl radical,

R$^{16}$O: independently an alkyleneoxy group having 2 to 4 carbon atoms, with the proviso that at least 50 mol % of the R$^{16}$O radicals are 1,2-ethyleneoxy groups, a: a number from 3 to 100, (Bb) anionic surfactants of the general formula R$^{15}$—O—(R$^{17}$O)$_b$—R$^{18}$—Y (VIII)

where the radicals are each defined as follows:

R$^{15}$: as already defined,

R$^{17}$O: independently alkyleneoxy groups having 2 to 4 carbon atoms, with the proviso that at least 30 mol % of the R$^{17}$ radicals are 1,2-ethyleneoxy groups and/or 1,2-propyleneoxy groups, R$^{18}$: a single bond or a divalent hydrocarbyl group having 1 to 10 carbon atoms, b: a number from 1 to 100, and Y: an acidic group or a salt thereof, selected from the group of sulfonate groups, sulfate groups, phosphonate groups, phosphoric acid groups or carboxyl groups, (Bc) star-shaped nonionic surfactants of the general formula R$^{19}$[(O—(CH—CH(R$^{20}$)—O)$_c$—(CH$_2$CH$_2$O)$_d$—(CH—CH(R$^{20}$)—O)$_e$—H]$_f$(IX) where the radicals are each defined as follows:

f: a number from 3 to 9,

R$^{19}$: an f-valent hydrocarbyl radical,

R$^{20}$: an aliphatic hydrocarbyl radical having 1 to 3 carbon atoms, c: a number from 0 to 2, d: a number from 2 to 50, e: a number from 2 to 50, and where the amount of the copolymers (A) in the formulation is 0.02 to 2% by weight, the amount of the surfactants (B) is 0.005 to 1.0% by weight, and the viscosity of the formulation is at least 5 mPas (measured at 25° C.).

2. The process according to claim 1, wherein the weight ratio of the copolymers to the surfactants (A)/(B) is 1:10 to 20:1.

3. The process according to claim 1, wherein the weight ratio of the copolymers to the surfactants (A)/(B) is 1:1 to 10:1.

4. The process according to claim 1, wherein water is injected into the mineral oil formation in a step preceding the injection of the aqueous formulation described.

5. The process according to claim 1, wherein the hydrophobically associating monomer (Aa) is at least one of the formula (I), and where R$^4$ is a hydrocarbyl radical having 3 to 8 carbon atoms, k is a number from 12 to 100, and R$^5$ is H, methyl or ethyl.

6. The process according to claim 5, wherein

R$^4$ is an n-propyl radical, k is a number from 15 to 80, and

R$^5$ is H.

7. The process according to claim 1, wherein the uncharged monomers (b1) are used in an amount of 30 to 95% by weight and the anionic monomers (Ab2) in an amount of 4.9 to 69.9% by weight, where the amounts are each based on the total amount of all monomers used.

8. The process according to claim 1, wherein the copolymer further comprises at least one monoethylenically unsaturated, cationic monomer (b3) comprising ammonium ions.

9. The process according to claim 8, wherein the cationic monomer (b3) comprises salts of 3-trimethylammoniumpropyl(meth)acrylamides and 2-trimethylammoniumethyl(meth)acrylates.

10. The process according to claim 8, wherein the uncharged monomers (b1) in an amount of 30 to 95% by weight and the anionic (Ab2) and cationic monomers (b3) together in an amount of 4.9 to 69.9% by weight, with the proviso that the molar ratio (Ab2)/(b3) is 0.7 to 1.3, and where the amounts are each based on the total amount of all monomers used.

11. The process according to claim 1, wherein the preparation of the hydrophobically associating copolymer (A) is undertaken in the presence of a nonpolymerizable, surface-active compound.

12. An aqueous formulation for mineral oil production comprising at least one water-soluble, hydrophobically associating polymer (A) and at least one surfactant (B), wherein the water-soluble, hydrophobically associating copolymer comprises (Aa) 0.1 to 15% by weight of at least one monoethylenically unsaturated, hydrophobically associating monomer (Aa) selected from the group of

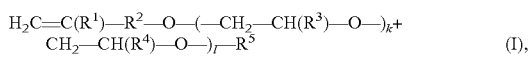

(I),

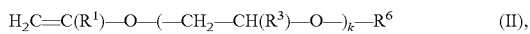

(II),

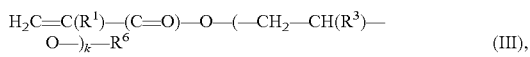

(III), where the -(—CH$_2$—CH(R$^3$)—O—)$_k$ and -(—CH$_2$—CH(R$^4$)—O—)$_l$ units are arranged in block structure in the sequence shown in formula (I) and the radicals an dindices are each defined as follows:

k: a number from 10 to 150, l: a number from 5 to 25,

R$^1$: H or methyl,

R²: a single bond or a divalent linking group selected from the group of —($C_nH_{2n}$)— [$R^{2a}$], —O—($C_nH_{2n'}$)— [$R^{2b}$] and —C(O)—O—($C_{n''}H_{2n''}$)— [$R^{2c}$], where n, n' and n'' are each natural numbers from 1 to 6, R³: each independently H, methyl or ethyl, with the proviso that at least 50 mol % of the R² radicals are H, R⁴: each independently a hydrocarbyl radical having at least 2 carbon atoms or an ether group of the general formula —$CH_2$—O—$R^{4'}$, where $R^{4'}$ is a hydrocarbyl radical having at least 2 carbon atoms, R⁵: H or a hydrocarbyl radical having 1 to 30 carbon atoms, R⁶: an aliphatic and/or aromatic, straight-chain or branched hydrocarbyl radical having 8 to 40 carbon atoms, and also (Ab) 85 to 99.9% by weight of at least two monoethylenically unsaturated, hydrophilic monomers (Ab) different than (Aa), where the monomers (Ab) comprise (Ab1) at least one uncharged, monoethylenically unsaturated, hydrophilic monomer (b1), selected from the group of (meth)acrylamide, N-methyl(meth)acrylamide, N,N'-dimethyl(meth)acrylamide or N-methylol (meth)acrylamide, and (Ab2) at least one anionic, monoethylenically unsaturated, hydrophilic monomer (Ab2) which at least one acidic group selected from the group of —COOH, —$SO_3H$ and —$PO_3H_2$ and salts thereof, where the proportions are each based on the total amount of all monomers in the copolymer and the copolymer has a weight-average molecular weight $M_W$ of $1*10^6$ g/mol to $30*10^6$ g/mol, and wherein (B) the at least one surfactant is a nonionic and/or anionic surfactant which is selected from the group of (Ba) nonionic surfactants of the general formula
$R^{15}$—O—($R^{16}$O)$_a$—H (VII) where the radicals are each defined as follows:

R¹⁵: a $C_{10}$- to $C_{36}$-hydrocarbyl radical,

R¹⁶O: independently an alkyleneoxy group having 2 to 4 carbon atoms, with the proviso that at least 50 mol % of the R¹⁶O radicals are 1,2-ethyleneoxy groups, a: a number from 3 to 100, (Bb) anionic surfactants of the general formula
$R^{15}$—O—($R^{17}$O)$_b$—$R^{18}$—Y (VIII) where the radicals are each defined as follows R¹⁵: as already defined, R¹⁷O: independently alkyleneoxy groups having 2 to 4 carbon atoms, with the proviso that at least 30 mol % of the R¹⁷ radicals are 1,2-ethyleneoxy groups and/or 1,2-propyleneoxy groups, R¹⁸: a single bond or a divalent hydrocarbyl group having 1 to 10 carbon atoms, b: a number from 1 to 100, and Y: an acidic group or a salt thereof, selected from the group of sulfonate groups, sulfate groups, phosphonate groups, phosphoric acid groups or carboxyl groups, (Bc): star-shaped nonionic surfactants of the general formula
$R^{19}$[(O—(CH—CH($R^{20}$)—O)$_c$—($CH_2CH_2O$)$_d$—(CH—CH($R^{20}$)—O)$_e$H]$_f$(IX) where the radicals are each defined as follows:

f: a number from 3 to 9,

R¹⁹: an f-valent hydrocarbyl radical,

R²⁰: an aliphatic hydrocarbyl radical having 1 to 3 carbon atoms, c: a number from 0 to 2, d: a number from 2 to 50, e: a number from 2 to 50, and where the amount of the copolymers (A) in the formulation is 0.02 to 2% by weight, the amount of the surfactants (B) is 0.05 to 0.5% by weight, and the viscosity of the formulation is at least 5 mPas (measured at 25° C.).

13. The aqueous formulation according to claim 12, wherein the weight ratio of the copolymers to the surfactants (A)/(B) is 1:10 to 20:1.

14. The aqueous formulation according to claim 12, wherein the weight ratio of the copolymers to the surfactants (A)/(B) is 1:1 to 10:1.

15. The aqueous formulation according to claim 12, wherein the hydrophobically associating monomer (Aa) is at least one of the formula (I), and where R⁴ is a hydrocarbyl radical having 3 to 10 carbon atoms, k is a number from 12 to 100, and R⁵ is H, methyl or ethyl.

16. The aqueous formulation according to claim 15, wherein

R⁴ is an n-propyl radical, k is a number from 15 to 80, and

R⁵ is H.

* * * * *